United States Patent [19]
Okada

[11] Patent Number: 5,515,175
[45] Date of Patent: May 7, 1996

[54] FACSIMILE MAIL SYSTEM CAPABLE OF MANAGING FACSIMILE MAIL DESIGNATION ERRORS

[75] Inventor: Akihiro Okada, Kawasaki, Japan

[73] Assignee: Fujitsu Limited, Kanagawa, Japan

[21] Appl. No.: 924,717

[22] Filed: Aug. 3, 1992

[30] Foreign Application Priority Data

Aug. 8, 1991 [JP] Japan .................................. 3-199598

[51] Int. Cl.⁶ .............................. H04N 1/21; H04N 1/32
[52] U.S. Cl. ........................ 358/402; 358/407; 358/434; 358/440; 358/444; 358/468
[58] Field of Search ................................... 358/402, 405, 358/406, 407, 440, 442, 463, 438, 434, 468, 444, 435, 436; 379/100, 89, 95

[56] References Cited

U.S. PATENT DOCUMENTS

| | | |
|---|---|---|
| 4,113,993 | 9/1978 | Heckman et al. . |
| 4,325,012 | 9/1982 | Verderber et al. ........................ 358/440 |
| 4,432,020 | 2/1984 | Onose et al. . |
| 4,994,926 | 2/1991 | Gordon et al. ........................... 358/440 |
| 5,008,926 | 4/1991 | Misholi .................................... 379/89 |
| 5,041,917 | 8/1991 | Koshiishi ................................. 358/434 |
| 5,226,097 | 7/1993 | Sakashita ................................ 358/463 |
| 5,237,427 | 8/1993 | Mizutori .................................. 358/406 |

FOREIGN PATENT DOCUMENTS

| | | |
|---|---|---|
| 62-213467 | 9/1987 | Japan . |
| 1-300758 | 12/1989 | Japan . |
| 2288460 | 11/1990 | Japan . |
| 2-271745 | 11/1990 | Japan . |
| 3108865 | 5/1991 | Japan . |
| 8903225 | 2/1990 | WIPO . |

OTHER PUBLICATIONS

IBM Technical Disclosure Bulletin, vol. 33, No11, Apr. 1991 "SNA Network Fax Gateway Conversions and Routing", pp. 479–480.

Primary Examiner—Scott A. Rogers

[57] ABSTRACT

A facsimile mail system capable of investigating the nature of any facsimile mail system errors based on push-button signal designation or optical mark reader sheet designation, and of readily checking communication lines for line quality. The system comprises a line processing portion for making, receiving and terminating calls to and from a telephone exchange, and an access managing portion for determining if a call-requested facsimile mail service is to be honored. The facsimile mail system further comprises a designation managing portion for storing into a magnetic disk storage the information obtained from the push-button signal or from the optical mark reader sheet upon facsimile communication, and a designation verification command portion for using its commands to retrieve information from the magnetic disk storage and to display the retrieved information on a display unit.

9 Claims, 5 Drawing Sheets

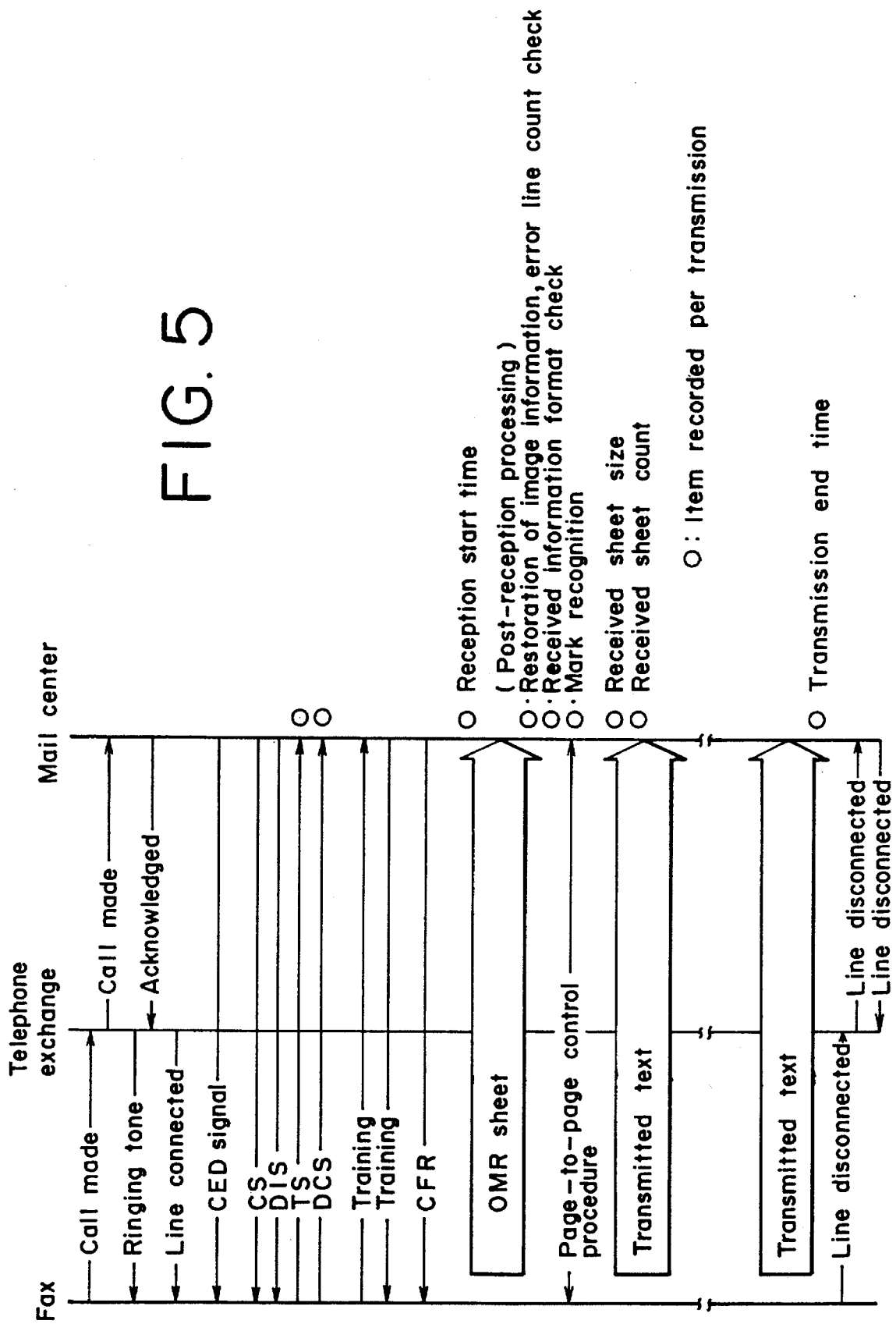

FACSIMILE MAIL SYSTEM CAPABLE OF MANAGING FACSIMILE MAIL DESIGNATION ERRORS

BACKGROUND OF THE INVENTION:

1. Field of the Invention

The present invention relates to a facsimile mail system and, more particularly, to a facsimile mail system capable of managing facsimile mail designation errors with ease.

2. Description of the related Art

Facsimile mail equipment established at a mail center is connected to a telephone exchange which in turn is connected to a plurality of subscriber facsimile machines (hereinafter called fax machines). The equipment is capable of broadcasting information simultaneously to a plurality of fax machines, storing in an appropriate order the information that may be received substantially at the same time, and transmitting the stored information to destinations in the order in which the information was received. Such facsimile mail equipment is included in a facsimile mail system that illustratively distributes in-house documents and slips within a corporation and, in the case of securities firms, sends securities-related information to subscribed customers.

The conventional facsimile mail system is operated generally by use of a push-button signal (hereinafter called a PB signal) or an optical mark reader sheet (hereinafter called an OMR sheet). The PB signal is generated by pushing push-buttons of a telephone set. The OMR sheet contains destination address information and is attached to the first page of the document to be transmitted. This type of facsimile mail system requires a function by which to manage push-button operation errors or OMR sheet designation errors so as to facilitate investigation of faults that may occur. Preferably, the system should also be equipped with an ability to check line quality without recourse to specialized measuring instruments.

As mentioned, there are two ways to activate and make use of the facsimile mail service. One way is for the user to call the mail center and to press push-buttons of the telephone set for entering a stipulated PB signal string according to the voice guidance sent from the mail center. The other way is for the user to attach an OMR sheet to the first page of the document to be transmitted and to forward the document along with the OMR sheet to the mail center. Conventional facsimile mail systems record the history of communications over each of the lines connected to fax machines.

Although conventional facsimile mail systems record communicative history of each of the lines attached, they lack the capabilities of recording the history of operations for utilizing the mail service, the results of acknowledging the designation by OMR sheet, the transmitting parties' names, or line quality readings. The lack of these capabilities has led to the perception of the following major disadvantages of the prior art:

When the PB signal is used to utilize the facsimile mail system, the user may commit errors inputting the signal by clumsily referring to the instruction manual or relying on his uncertain memory. For example, entering a wrong destination name in keeping with the input conditions causes the transmitted document to bypass the correct destination and reach an unintended party. In that case, the mail center cannot discern the erroneous operation well enough to attribute it to a user error, to poor line quality or to the system's faulty processing. That is, a clear-cut answer to that went wrong cannot be obtained.

Where the OMR sheet is used to operate the facsimile mail system, the mail equipment may not recognize the mark depending on its density, length and position upon mark entry by the user into the OMR sheet. Furthermore, the mark may not be recognized due to poor line quality. As in the case of the PB signal, the mail center cannot discern the erroneous operation well enough to attribute it definitively to whoever or whatever is responsible. Again, a clear-cut answer to what or who caused the error is unavailable.

Fax mail is intrinsically vulnerable to various kinds of poor line quality, i.e., aging-caused line degeneration, radio wave-induced line noise from the outside, or line noise due to voltage fluctuations (e.g., caused by elevator operation). In such cases, part of the information transmitted may become missing, or too many bit errors may render fax communication impossible.

To avoid the above problems requires carrying out line maintenance conscientiously and unremittingly using dedicated measuring instruments that examine selected communication paths for line quality. Taking these measurements— or merely installing the necessary instruments for that matter—calls for a temporary stoppage of the communication service. In addition, it takes unacceptably many man-hours to perform the measurements on each of the communication paths designated.

SUMMARY OF THE INVENTION

It is therefore an object of the present invention to provide a facsimile mail system which performs fault investigation with efficiency and precision by suitably managing telephone push-button operating errors and OMR sheet entry errors.

It is another object of the invention to provide a facsimile mail system which readily measures line quality without using specialized measuring instruments.

In accordance with an aspect of the present invention, there is provided a facsimile mail system having a plurality of telephone sets, a plurality of facsimile machines each connected to the respective telephone sets, and a telephone exchange connected via lines to the plurality of facsimile machines, the facsimile mail system comprising: line processing means for making, receiving and terminating calls to and from the telephone exchange, the line processing means including push-button signal recognizing means for recognizing push-button signal of a telephone set, guidance outputting means for outputting a voice guidance via the telephone exchange to a transmitting telephone set from which a call is received, facsimile communication processing means for receiving all facsimile information coming from the facsimile machine connected to the transmitting telephone set, means for checking to see if the format of an optical mark reader sheet transmitted along with the information is correct, and communication history managing means for managing the history of communications on each of the lines connected with the plurality of facsimile machines; recognition processing means for recognizing the optical mark reader sheet; line managing means for managing the line processing means; access managing means for judging the possibility of granting a facsimile mail service according to the result of the recognition by the push-button signal recognizing means regarding the push-button signal and by the recognition processing means regarding the optical mark reader sheet; storage means for storing facsimile information; designation managing means for controlling the storage, into the storage means, of the information obtained from the push-button signal and from the optical mark reader sheet; and mail function processing means for controlling the transmission of the facsimile information through one of a plurality of mail Functions which is selected under control of the access managing means.

In a preferred structure according to the invention, the facsimile mail system Further comprises a system console equipped with a display unit and designation verification command means for retrieving, using commands furnished therein, information from the storage means for display on the display unit.

Structured in this way, the facsimile mail system can readily determine whether any fault committed upon PB signal designation is attributable to the user's push-button operating error or to a system error. The facsimile mail system also facilitates the investigation, where the mail service is utilized by designating an OMR sheet, of whether the fault that occurred is attributable to the user's sheet entry error or to a recognition error made by the system. Furthermore, the facsimile mail system permits easy checkups on communication lines for line quality without recourse to specialized measuring instruments and without halting the ongoing communication service.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 5 is a view showing how the embodiment operates illustratively in executing facsimile communication based on OMR sheet designation.

Figure 1:
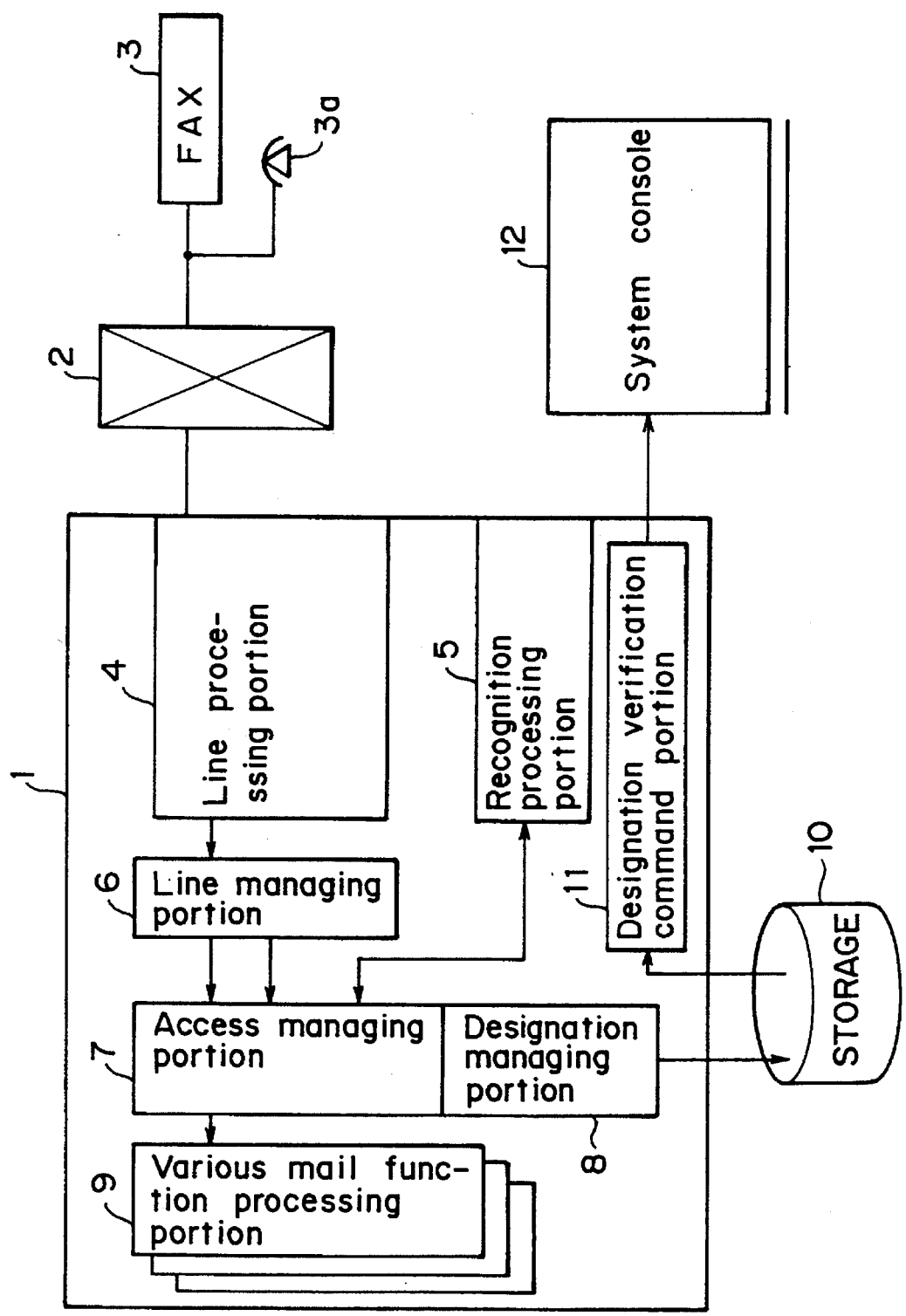
FIG. 1 is a block diagram of a facsimile mail system embodying the present invention.

DESCRIPTION OF THE PREFERRED EMBODIMENTS:

A preferred embodiment of the invention will now be described in detail with reference to the accompanying drawings. In the block diagram of FIG. 1 showing the facsimile mail system embodying the information, reference numeral 1 is fax mail equipment installed at a fax mail center. Although the figure depicts only one fax machine 3 and one push-button telephone set 3a under space constraints, the mail equipment 1 in practice is connected to numerous fax machines 3 and telephone sets 3a via a telephone exchange 2.

The fax mail equipment 1 comprises a line processing portion 4, a recognition processing portion 5, a line managing portion 6, an access managing portion 7, a designation managing portion 8, a various mail function processing portion 9, a magnetic disk unit 10, and a designation verification command portion 11. A system console 12 is connected to the designation verification command portion 11 of the fax mail equipment 1.

The line processing portion 4 carries out line processing, push-button (PB) signal recognition, guidance output, fax communication processing, optical mark reader (OMR) format check, and communication history management.

The line processing involves making, receiving and terminating calls to and from the telephone exchange 2. The PB recognition refers to the process of recognizing a PB signal which is generated by the user operating push-buttons of the telephone set 3a for transmission to the fax mail equipment 1 via the telephone exchange 2. The guidance output is a function that outputs a voice guidance via the telephone exchange 2 to the transmitting telephone set 3a from which tile fax mail equipment 1 has received the call. For example, the voice guidance, "This is the Mail Center. Please input the number . . . ," is output to the transmitting party. The transmitting party follows the guidance and inputs the required number accordingly.

The fax communication processing refers to the process of receiving all fax information sent from the fax machine 3. The OMR format check is a function that checks to see if the format of the received OMR sheet is correct. The communication history management is a function that managing the communication history of each of the lines connected. The number of the line processing portions 4 furnished corresponds on a one-for-one basis with-the number of the lines connected. Generally the telephone exchange 2 has dozens of lines attached thereto. It follows that there should be provided dozens of line processing portions 4.

The recognition processing portion 5 is designed to recognize the OMR sheet transmitted. On receiving fax communication and finding that it is based on OMR sheet designation, the recognition processing portion 5 forwards all fax information together with the result of the OMR sheet recognition to the access managing portion 7. One recognition processing portion 5 is provided for every four line processing portions 4.

The line managing portion 6 manages the line processing portion 4. The access managing portion 7 checks to see if the received service request is to be honored. That is, the subscriber ID (identification) and function code contained in the PB signal or OMR sheet received are checked, and the subscriber number and the destination are ascertained. Also checked are whether this subscriber may use the mail center, whether the subscriber may utilize this particular mail service, and whether the requested destination is an authorized destination. When all subscriber conditions have been met through the checkups, the access managing means 7 invokes an appropriate mail function from the various mail function processing portion 9, to be described later.

The designation managing portion 8 is one of the elements characterizing the present invention. This element controls the following four functions (1) through (4) on the basis of a transmission request from the user:

(1) A function for recording user operations based on the PB signal. This function involves storing into the magnetic disk unit 10 the PB signal that is sent by every user operating the telephone set 3a.

(2) A function for recording the transmitting fax machine number upon OMR sheet-based access. This function utilizes the TSI of the facsimile transmission procedure as recommended in T.30 of CCITT. In operation, the function stores into the magnetic disk unit 10 the transmitting/ receiving ID (transmitting fax machine number) in effect upon access by OMR sheet.

(3) A function for recording an error line count in effect upon OMR sheet recognition. This function checks each of the lines for error in a 256-segment mark field of each mark on the sheet. The error count per line is stored into the magnetic disk unit 10.

(4) A function for recording the result of OMR sheet recognition. This function recognizes the mark designated on the OMR sheet upon OMR sheet-based access, and stores the result of the recognition into the magnetic disk unit 10.

Figure 2:
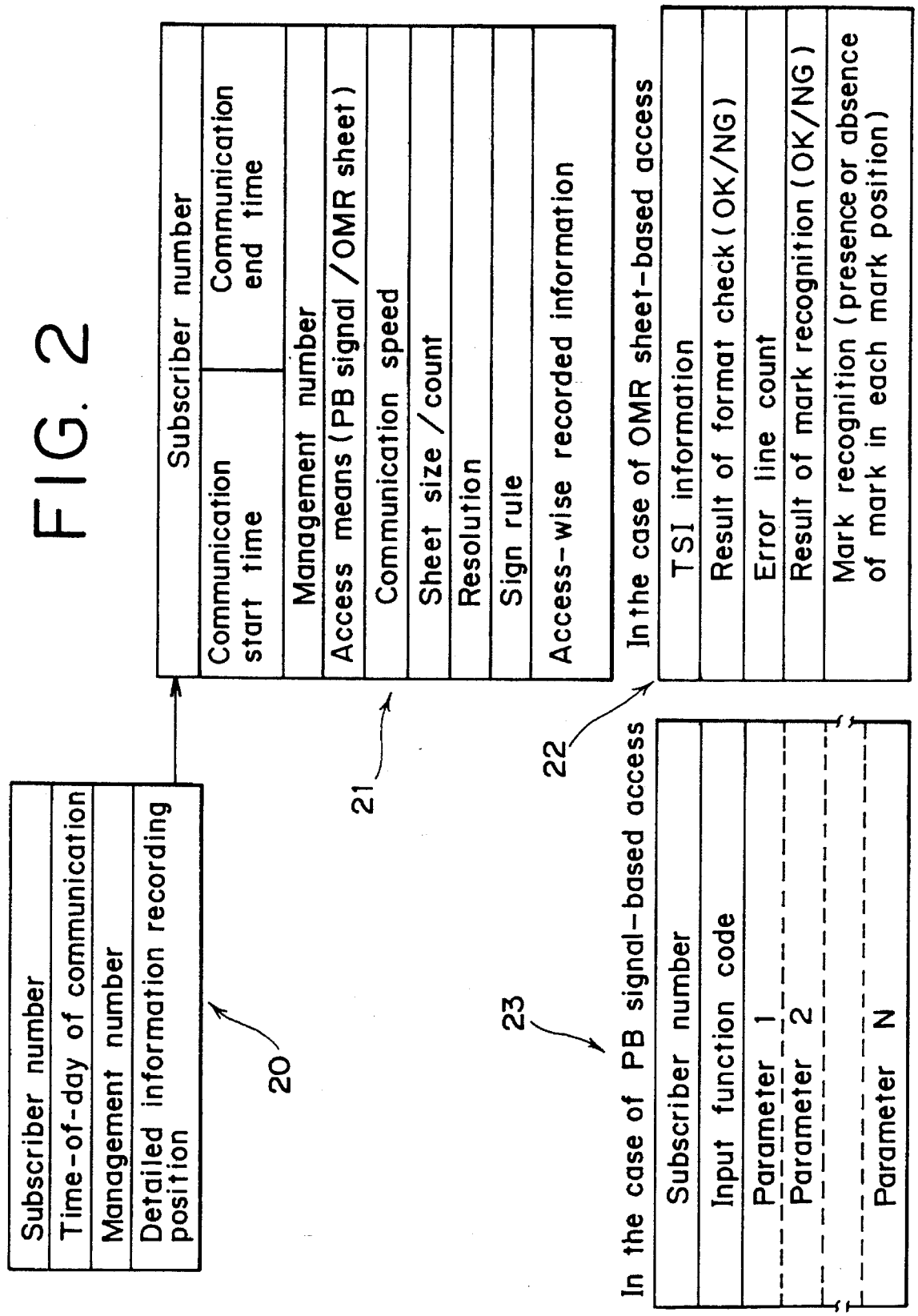
FIG. 2 is a view describing a typical format in which recorded information in magnetic disk storage is managed by the embodiment.

The various mail function processing portion 9 provides control over transmitting text using various mail functions such as broadcasting, special delivery and confidential delivery. As described, the magnetic disk unit 10 records various kinds of information. The format in which to manage the recorded information is specific to the invention, as illustrated in FIG. 2. The recorded information managing format of FIG. 2 is a format in which the recorded information is illustratively displayed on a display unit, not shown, of the system console 12 via the designation verification command portion 11, another key element of the invention.

On receiving keyboard-entered instructions from the system console 12, the designation verification command portion 11 uses commands to retrieve the recorded files in the magnetic disk unit 10 for output to the system console 12. The command functions of the designation verification command portion 11 include: a function for successively outputting information in the order designated by fax information; a function for successively outputting information in the subscriber-designated order; a function for retrieving information by the designated subscriber and designated date for output; a function for retrieving information for output by the designated fax machine number upon OMR sheet-based access; a function for retrieving information by the designated fax machine number and designated date for output; a function for retrieving information by the designated fax machine number and by NG (no good) designation for output; and a function for retrieving information by the designated fax machine number, by NG designation and by the designated date for output.

The display unit of the system console 12 first displays an index field 20 shown in FIG. 2. The index field contains the subscriber number, time-of-day indication of communication, management number and detailed information recording position. Generally indicated by reference numeral 21, the detailed information recording position is composed of the subscriber number, time-of-day indication of communication start, time-of-day indication of communication end, management number, access means (PB signal or OMR sheet), fax communication information (transmission speed, sheet size/count, resolution, sign rule), and access-wise recorded information.

The access-wise recorded information falls into one of two categories: OMR sheet access recorded information, as indicated in an OMR sheet access field 22, and PB signal access recorded information, as shown in a PB access field 23. The OMR sheet access field 22 comprises TSI information (transmission fax machine number), result of format check (OK/NG), an error line count, result of mark recognition (OK/NG), and a mark recognition indication (presence or absence of the mark in each mark position). The result of mark recognition simply indicates whether or not the mark is recognized upon check. The result of the check is shown in the "mark recognition" region at the bottom. The PB sheet access field 23 is made of the subscriber number, an input function code, and parameters 1 through N.

In the embodiment of the above structure, a PB signal is issued illustratively to access the fax mail equipment 1 for fax communication. How the embodiment works in this case will now be described with reference to FIGS. 1 and 3.

Figure 3:
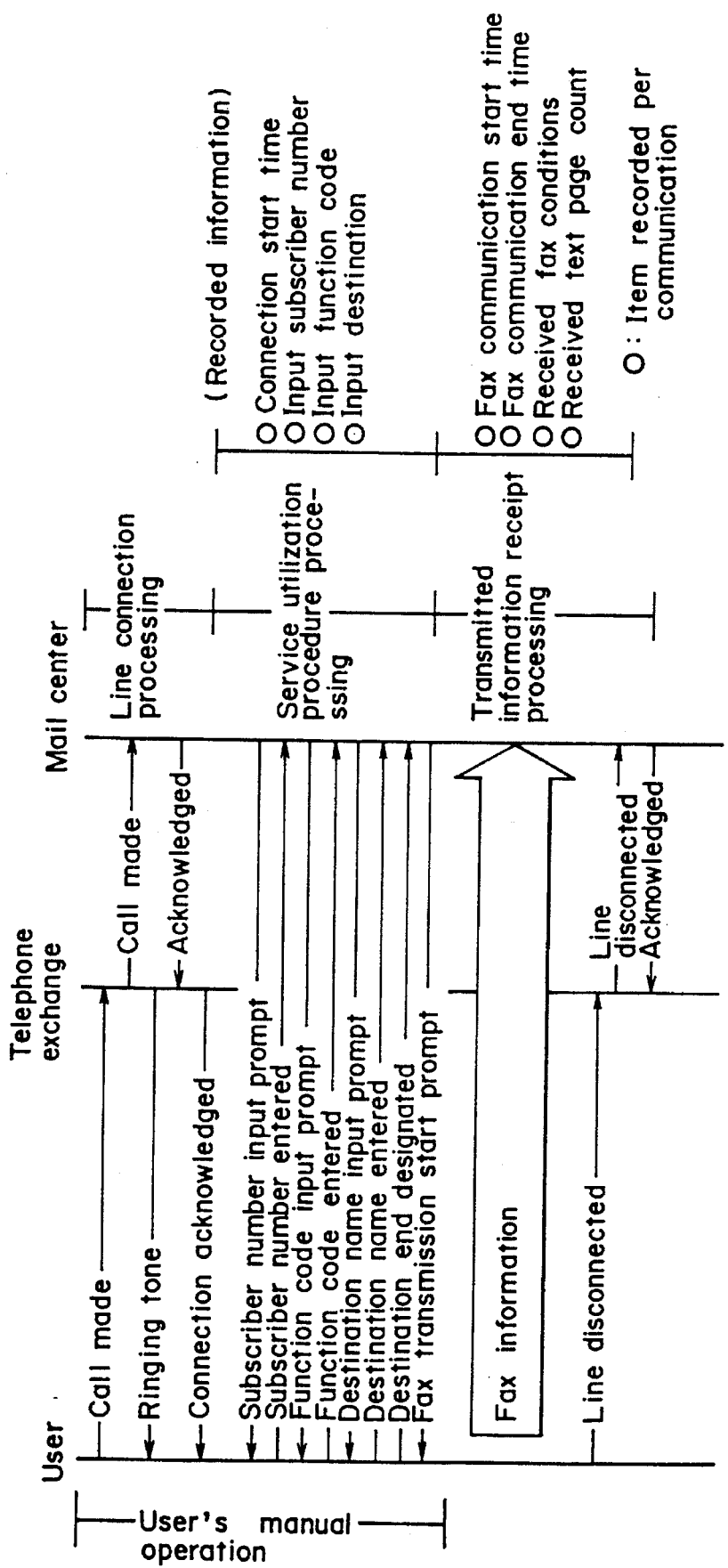
FIG. 3 is a view depicting how the embodiment carries out facsimile communication based on PB signal designation.

In FIG. 3, the user first makes a call using the telephone set 3a. In turn, the telephone exchange 2 sends the call to the fax mail equipment 1 of the mail center. At the same time, a ringing tone is transmitted to the user's telephone set 3a. When the call is received by the fax mail equipment 1, the line processing portion 4 of the equipment 1 performs line connection processing.

With the line connected, the fax mail equipment 1 responds to the telephone exchange 2 which in turn sends a connection acknowledge signal to the telephone set 3a. This completes the line connection ranging from the fax mail equipment 1 through the user's telephone set 3a to the fax machine 3. Then a service utilization procedure is initiated. At this point, the line connection start time is recorded in the magnetic disk unit 10 under control of the access managing portion 7.

The line processing portion 4 of the fax mail equipment 1 outputs a subscriber number input prompt (i.e., voice guidance) to the user. The user follows the voice guidance and transmits his subscriber number using a PB signal to the fax mail equipment 1. When the subscriber number is entered into the fax mail equipment 1, the number is then recorded in the magnetic disk unit 10.

The fax mail equipment 1 then outputs a function code input prompt to the user. In response, the user transmits an appropriate function code to the fax mail equipment 1. When the function code is entered into the fax mail equipment 1, that code is recorded as an input function code to the magnetic disk unit 10 under control of the designation managing portion 8. Next, the fax mail equipment 1 outputs a destination input prompt to the user. In response, the user transmits a desired destination name to the fax mail equipment 1. The input designation name is recorded in the magnetic disk unit 10 under control of the designation managing portion 8. The input function code and the input designation name recorded in the magnetic disk unit 10 are additional records that characterize the invention.

When the user sends a destination end signal to the fax mail equipment 1, the line processing portion 4 of the fax mail equipment 1 in turn transmits a fax transmission start prompt to the user. At this point, the user's manual operation ends and the fax information established at the fax machine 3 is output to the fax mail equipment 1. On receiving the fax information, the fax mail equipment 1 initiates transmitted information receiving processing. That is, the fax mail equipment 1 typically records the fax communication start time, fax communication end time, received fax conditions, and received text page count to the magnetic disk unit 10. After completing the transmission of the fax information, the fax machine 3 outputs a line disconnection request to the fax mail equipment 1 via the telephone exchange 2. Upon receipt of this request, the line processing portion 4 of the fax mail equipment 1 sends back an acknowledge signal and disconnects the line.

With the embodiment operating in the above manner to perform fax communication based on PB signal designation, the designation managing portion 8 provides control over recording the input function code and the input destination name into the magnetic disk unit 10. If the input function code or input destination name contains an error, the nature of that error is identified precisely. Errors in the input function code are attributable to users' making operating mistakes when employing sophisticated fax-related functions. Errors in the input destination name are committed by users trying to input a plurality of destinations all at once. However, with conventional fax mail equipment incapable of recording the two kinds of errors, it is impossible to know precisely what went wrong and where regarding such incidents.

Information in the magnetic disk unit 10 is retrieved therefrom, as described, through the designation verification command portion 11 and forwarded to the display unit of the system console 12 For display. During retrieval, the information is displayed in a progressively detailed manner starting from the index field 20, as depicted in FIG. 2. This hierarchical manner of display permit's easy information retrieval.

An OMR sheet is then used illustratively to access the fax mail equipment 1 for fax communication. How the embodiment works in this case will now be described.

Figure 4:
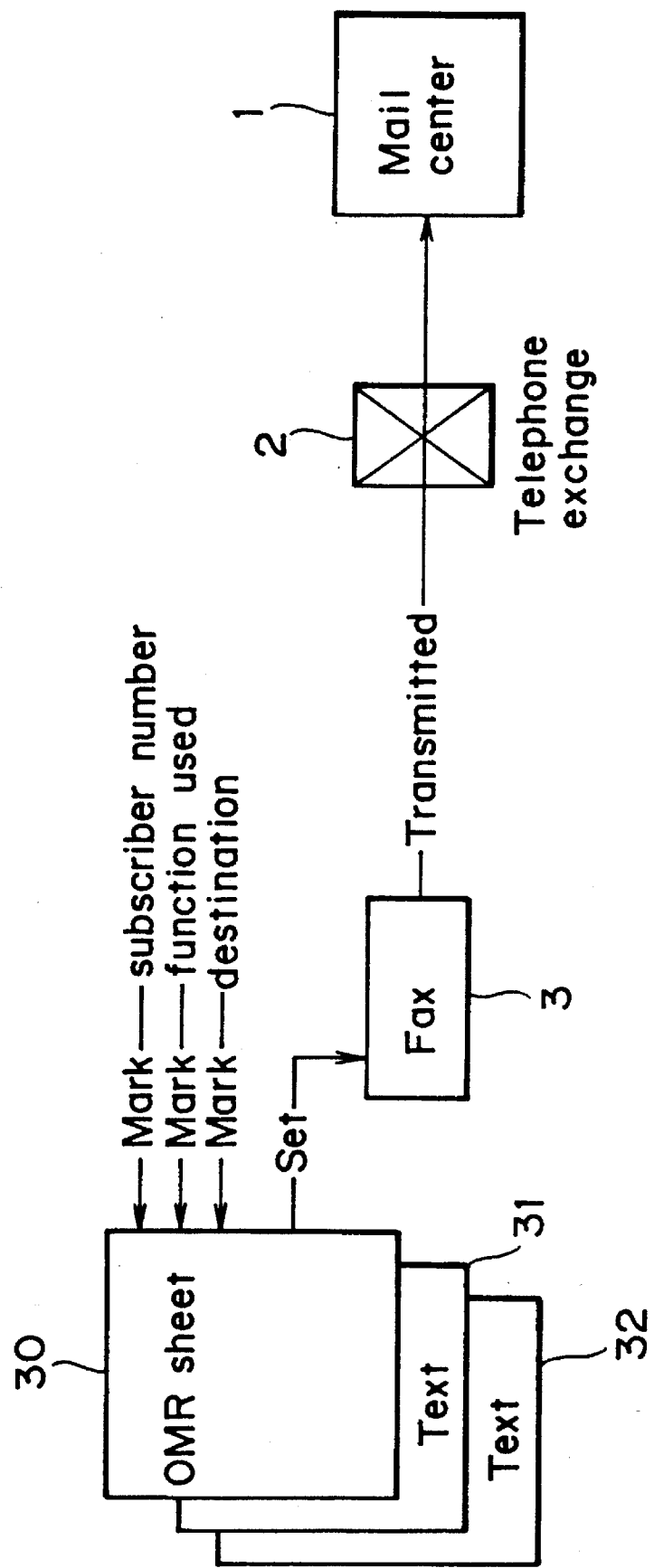
FIG. 4 is a schematic view of how the embodiment performs facsimile communication based on OMR sheet designation.

First, as shown in FIG. 4, the user marks by pencil the subscriber number, desired function, and destination in their positions on an OMR sheet 30 as designated by the mail center. The OMR sheet 30 is then used as page 1 of message sheets 31 and 32, and the entire collection of sheets is set on the fax machine 3. Appropriate user operations transmit the message from the sheets via the telephone exchange 2 to the fax mail equipment 1 at the mail center.

More specifically, the message transmission takes place as follows and will be explained referring to FIG. 5. With the OMR sheet 30 and the message sheets 31 and 32 set on the fax machine 3, the fax machine 3 makes a call. The telephone exchange 2 calls up the fax mail equipment 1 at the mail center and simultaneously sends a ringing tone to the user's fax machine 3. When the fax mail equipment accepts the call, the line processing portion 4 therein performs line connection processing and sends a call acknowledge signal back to the telephone exchange 2. In turn, the telephone exchange 2 sends a line connection signal to the telephone set 3a.

The fax mail equipment 1 then transmits a CED (called equipment discrimination signal; at 2,100 Hz). After this, the fax mail equipment 1 sends to the fax machine 3 a CSI (called station identification signal) in accordance with the recommendations of T.30 of CCITT. Furthermore, the fax mail equipment I transmits a DIS (digital identification signal) to the fax machine 3. The DIS is a signal designed to harmonize the communication protocol between the transmitting fax machine 3 and the receiving fax machine. That is, the signal harmonizes the communication speed, sheet size/count, resolution and sign rule between the two parties involved.

With the communication protocol thus established, the fax machine 3 sends a TSI (transmitting station identification signal) to the fax mail equipment 1. The transmitting fax machine number (transmitting/receiving ID) in the TSI is recorded in the magnetic disk unit 10 under control of the designation managing portion 8. The fax machine 3 sends to the fax mail equipment 1 a DCS (digital command signal) for harmonizing the communication protocol between the two parties. The communication protocol (i.e., communication speed, sheet size/count, resolution, sign rule) is recorded in the magnetic disk unit 10.

After the above-described fax communication procedure has been completed, the fax machine 3 outputs to the fax mail equipment 1 an image information transmission modem training signal for communicating at the required speed (e.g., 9,600 bps) between transmitting and receiving fax machines. In turn, the fax mail equipment 1 sends an image information transmission modem training signal to the fax machine 3. The proceedings ascertain the communication speed. After this, the fax mail equipment 1 transmits to the fax machine 3 a CFR (check For receipt signal) of the fax communication procedure.

When it is verified at the fax machine 3 that the preparations for reception are completed, the OMR sheet is transmitted to the fax mail equipment 1. The transmitted OMR sheet is received by the recognition processing portion 5 of the fax mail equipment 1. At the time of OMR sheet reception, the reception start time is recorded in the magnetic disk unit 10. After the recognition processing portion 5 has received the OMR sheet, image information is restored, the received information format is checked, and the OMR sheet mark is recognized. The results of these processes are recorded in the magnetic disk unit 10 under control of the designation managing portion 8. At the same time, page-to-page control is carried out between the fax mail equipment 1 and the fax machine 3.

Then the text is transmitted successively from the fax machine 3 to the fax mail equipment 1, with the received sheet size and the received sheet count taken and recorded in the magnetic disk unit 10. When the end of the text is reached, the transmission end time is recorded in the magnetic disk unit 10. The fax machine 3 then outputs a line disconnection request to the fax mail equipment 1 via the telephone exchange 2. On receiving the request, the line processing portion 4 of the fax mail equipment 1 disconnects the line.

With the embodiment operating in the above manner to perform fax communication based on OMR sheet designation, the nature of text transmission to a wrong destination despite the normal completion of the fax communication processing is identified precisely based on the complaint from the user or subscriber. What actually took place at the time of the transmission is found out exactly by retrieving the transmitting fax machine number (transmitting/receiving ID) in the TSI concerned and the reception start time associated therewith from the magnetic disk unit 10.

In case the mark on any OMR sheet was totally unrecognizable, the origin of the fax information is isolated by checking the transmitting fax machine number (transmitting ID). The reason for the inability to recognize the mark is found out by comparing two facts: where on the 256 mark area the transmitting party actually marked, and what resulted from the mark recognition process. That is, it becomes clear whether the Fault is attributable to the faulty recognition committed by the system, or to the transmitting party's inappropriate manner of marking the OMR sheet.

If the user's marking was correct but the recognition of the mark by the system was faulty, the probable cause for that fault is a degradation in line quality on the network. The suspicion is confirmed by verifying the results of error line count checks recorded in the magnetic disk unit 10. That is, a drop in line quality is reflected in an increase in the error line count. Since TSI recordings in the results of the error line count checks indicate which fax machine transmitted the text of the poor quality it is easy to determine the suspected transmission route involving that fax machine. That is, unlike conventional fax mail systems, the embodiment of the invention provides constant checkups on the lines for line quality without recourse to specialized measuring instruments.

As many apparently different embodiments of this embodiment may be made without departing from the spirit and scope thereof, it is to be understood that the invention is not limited to the specific embodiments thereof except as defined in the appended claims.

What is claimed is:

1. A facsimile mail system having a plurality of telephone sets, a plurality of facsimile machines each connected to said respective telephone sets, and a telephone exchange connected via lines to said plurality of facsimile machines, said facsimile mail system comprising:

line processing means for making, receiving and terminating calls to and from said telephone exchange, said line processing means including push-button signal recognizing means for recognizing a push-button signal of a telephone set, guidance outputting means for outputting a voice guidance via said telephone exchange to a transmitting telephone set from which a call is received, facsimile communication processing means for receiving all facsimile information coming from the facsimile machine connected to said transmitting telephone set, means for checking to see if the format of an optical mark reader sheet transmitted along with said information is correct, and communication history managing means for managing the history of communications on each of said lines connected with said plurality of facsimile machines;

recognition processing means for recognizing said optical mark reader sheet;

line managing means for managing said line processing means;

access managing means for judging the possibility of granting a facsimile mail service according to the result of the recognition by said push-button signal recognizing means regarding said push-button signal and by said recognition processing means regarding said optical mark reader sheet;

storage means for storing said facsimile information;

designation managing means coupled to said access managing means and to said storage means, for controlling the storage, into said storage means, of the information obtained from said push-button signal and from said optical mark reader sheet; and mail function processing means for controlling the transmission of said facsimile information through one of a plurality of mail functions which is selected under control of said access managing means, wherein said designation managing means includes means for performing error checks on the mark entry of said optical mark reader sheet for each of the lines connected with said plurality of facsimile machines, and for storing the error count per line in said storage means, and wherein said destination managing means also includes means for providing control over recognizing the mark designated on said optical mark reader sheet and storing the result of the recognizing process in said storage means.

2. A facsimile mail system according to claim 1, further comprising:

a system console having a display unit; and designation verification command means connected to said storage means and said system console for using commands furnished therein to retrieve information from said storage means and displaying the retrieved information on said display unit.

3. A facsimile mail system according to claim 2, wherein said storage means accommodates information in a recording format made of an index field and a detailed information recording field;

said index field containing a subscriber number, a time-of-day indication of communication, a management number and a detailed information recording position; and said detailed information recording field containing a subscriber number, a communication start time indication, a communication end time indication, a management number, an access type, facsimile communication information, and access-wise recorded information.

4. A facsimile mail system according to claim 3, wherein the area in said storage means for accommodating said access-wise recorded information includes an optical mark reader sheet access information region and a push-button access information region;

said optical mark reader sheet access information region containing the results of recognizing said optical mark reader sheet; and said push-button access information region containing subscriber numbers, input function codes, and a plurality of parameters.

5. A facsimile mail system according to claim 4, wherein said results of recognizing said optical mark reader sheet include a transmitting facsimile machine number, results of format check, an error line count, results of mark recognition, and an indication of any one of the presence and absence of the mark in each mark position designated.

6. A facsimile mail system according to claim 3, wherein said facsimile communication information includes a communication speed, a sheet size, a sheet count, resolution data and sign rules.

7. A facsimile mail system according to claim 4, wherein information is retrieved from said storage means and displayed on said display unit in any one of two hierarchical manners of display, one of said two hierarchical manners constituting the order in which said information is displayed starting from said index field to said detailed information recording field to said optical mark reader sheet access information region, the other of said two hierarchical manners constituting the order in which said information is displayed starting from said index field to said detailed information recording field to said push-button access information region.

8. A facsimile mail system according to claim 2, wherein said system console issues instructions to gain access to said designation verification command means, to thereby retrieve information from said storage means for display onto said display unit.

9. A facsimile mail system according to claim 1, wherein said designation managing means further includes means for providing control over storing into said storage means a transmitting identification signal and a receiving identification signal, the two signals being designated by said optical mark reader sheet.

* * * * *